United States Patent [19]

Gullota

[11] 4,215,838
[45] Aug. 5, 1980

[54] MUSICAL INSTRUMENT STAND DEVICE

[75] Inventor: Leonard Gullota, Valencia, Calif.

[73] Assignee: La Voz Corporation, Sun Valley, Calif.

[21] Appl. No.: 833,150

[22] Filed: Sep. 14, 1977

[51] Int. Cl.² .............................................. F16M 11/04
[52] U.S. Cl. .................................... 248/121; 248/167; 248/176; 248/316 B
[58] Field of Search ............... 248/121, 163, 164, 431, 248/165, 166, 167, 316 B, 316 F, 176; 84/327, 328, 329

[56] References Cited

U.S. PATENT DOCUMENTS

| 1,541,306 | 6/1925 | Young | 248/316 B |
|---|---|---|---|
| 1,612,148 | 12/1926 | Oettinger | 84/327 |
| 1,780,163 | 11/1930 | Anderson | 248/167 |
| 1,968,462 | 7/1934 | Merhell | 24/249 R |
| 2,007,574 | 7/1935 | Lang | 248/167 |
| 2,030,775 | 2/1936 | Twiss | 248/167 X |
| 2,464,031 | 3/1949 | Fiedel | 248/167 |
| 2,502,229 | 3/1950 | Miller | 84/327 |
| 2,656,140 | 10/1953 | Petruschell | 24/249 R |
| 2,852,830 | 9/1958 | Lloyd et al. | 24/249 LS |
| 3,958,786 | 5/1976 | Mann | 84/327 |

FOREIGN PATENT DOCUMENTS

| 841679 | 6/1952 | Fed. Rep. of Germany | 248/167 |
|---|---|---|---|
| 1315661 | 12/1962 | France | 24/249 R |

*Primary Examiner*—Rodney H. Bonck
*Attorney, Agent, or Firm*—Blakely, Sokoloff, Taylor & Zafman

[57] ABSTRACT

A collapsible musical instrument (e.g., saxaphones, etc.) stand having a self-releasing instrument cradle is disclosed. The stand may easily be erected from a folded position. The stand includes an instrument cradle comprising a curved cradle member, to the extremities of which are pivotally coupled two arcuate arm members. The body of the instrument is placed in the cradle so that bottom portions of each arm are depressed, causing the upper curved portions to pivot around the instrument thereby securely supporting the instrument on the stand. To release the instrument, it is merely lifted away, the arm members pivoting open so that the instrument is automatically released. Other improvements are disclosed.

14 Claims, 6 Drawing Figures

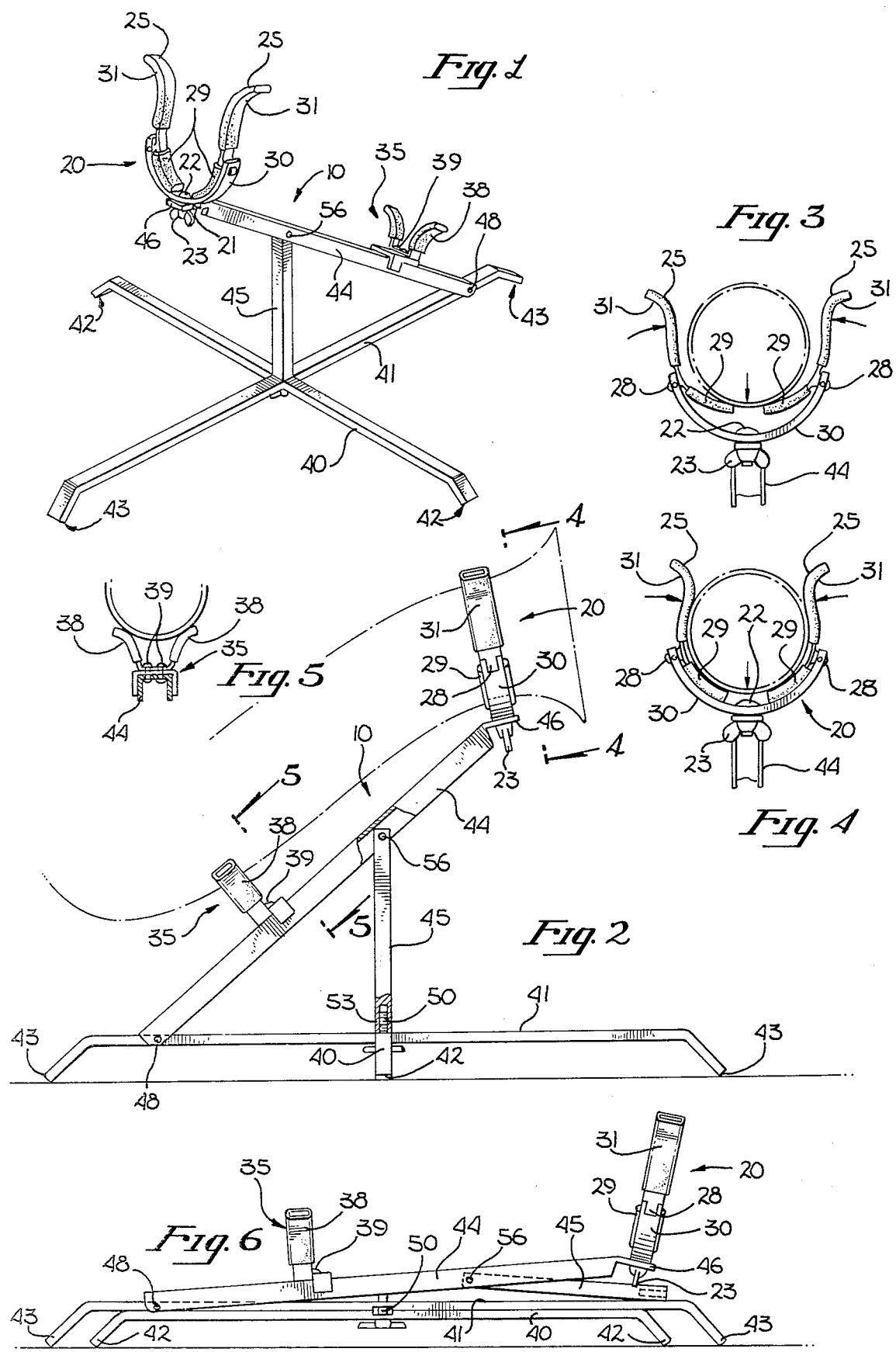

MUSICAL INSTRUMENT STAND DEVICE

BACKGROUND OF THE INVENTION

1. Field of the Invention

The present invention relates to the field of musical instrument stands, and in particular to musical instrument stands having self-releasing instrument cradles.

2. Description of the Prior Art

Musical stands are commonly used to support an instrument in an upright position so that damage from tipping and striking a hard surface is eliminated. These stands are needed by musicians who play one or more than one instrument in a band or orchestra, and who often have to switch between one instrument or the other. In such instances, the musician is typically rapidly switching from one instrument to another and therefore has need of a stand which will not only provide effective support but also aid in the rapid transfer of the instruments. One type of instrument stand commonly used in the past utilizes a clamp which bears against the instrument body when the instrument is placed in the stand. Such stands suffer the disadvantage that when the musician attempts to pick the instrument up from the stand, the clamp does not release immediately and therefore two hands (or other means) would be required to separate the stand and instrument, one gripping the instrument, the other the stand. The procedure is awkward, particularly when the musician plays in an orchestra or band in either a formal setting or in situations where the rapid transition from one instrument to another is required. While this problem could be alleviated by increasing the weight of the stand or affixing the stand to an immovable object, it is required that these units be lightweight and preferably collapsible, as each musician typically owns not only his own instruments, but also the musical instrument stands in which these are placed and commonly carries these with him from engagement to engagement.

It is therefore an object of the present invention to provide an instrument stand wherein the instrument cradling mechanism is self-releasing so that the instrument may be removed from the stand without requiring the use of both hands or some other means.

It is another object of the present invention to provide an instrument stand wherein the musical instrument is protected from damage from the contacting surfaces.

Still another object of the present invention is to provide a musical instrument stand which is collapsible into an easily carried configuration.

Other objects and advantages of the subject invention will be apparent from the description hereinbelow.

SUMMARY OF THE INVENTION

A collapsible music instrument stand having a self-releasing instrument cradle is disclosed. The stand comprises two elongated base members which in the erected position intersect each other at right angles to form a support base, an inclinable member pivotally attached to one of the base members, a center brace member pivotally attached to the inclined member so that the inclined member may be elevated at an angle with respect to the base member and the center brace member pivoted vertically downward for connection at the intersection point of the base members, thereby providing support to the inclinable member in the erected position. At the uppermost extremity of the channel member is attached an instrument cradle comprising a curved cradle bracket having up-turned and outwardly extending ends, and arcuate arms which are pivotally attached to the ends of the cradle bracket so that a portion of each arcuate arm extends along portions of the curved cradle bracket. When the instrument is placed in the cradle it contacts the bottom portions of the arm members causing the opposite ends of the arcuate arms to pivot inwardly over the instrument. A second support member is positioned near the opposite end of the channel member to provide a second contact location for the instrument. To remove the instrument, the instrument is simply lifted away, the body of the instrument contacting the upper ends of the arcuate arms, causing the arms to pivot open, thereby releasing the instrument.

BRIEF DESCRIPTION OF THE DRAWINGS

FIG. 1 is a plan view of the subject instrument stand in its erected configuration.

FIG. 2 is a side view of the instrument stand showing an instrument in position.

FIG. 3 is a cross-sectional view taken along line 3—3 of FIG. 2, showing a head-on view of the cradle member.

FIG. 4 is also a cross-sectional view showing the cradle and horn in phantom placed in the stand.

FIG. 5 is a cross-sectional view taken along line 5—5 of FIG. 2, showing the rigid support member contacting the instrument.

FIG. 6 is a side view showing the subject instrument stand in its folded condition.

DETAILED DESCRIPTION OF THE INVENTION

Referring now to FIG. 1, the preferred embodiment of the subject invention is shown in plan view. While this embodiment in these FIGURES is adapted for use with a saxophone, it is to be understood that the stand may be used to support a variety of other instruments, although design changes in dimensions may be required to accommodate such other instruments.

The instrument stand comprises (i) elongated base members 40 and 41, which intersect each other at approximately right angles in the erected position, (ii) elongated inclinable member 44 pivotally attached to base member 41 adjacent an end of the base member 41, (iii) center brace member 45, one end pivotally attached to the inclinable member 45 and having a threaded bore in the other end, (iv) support fixture 35, and (v) instrument cradle 20.

As shown in FIG. 1, base members 40 and 41 are elongated, substantially straight members, having feet 42 and 43 which are formed to project downward to contact the floor. In the preferred embodiment, base members 40 and 41 are fabricated from metal bars, with the ends of the bars bent angularly downward to form the floor contacting feet 42 and 43. Channels are formed in the facing sides of, and orthogonally to, each base member 40 and 41 at approximately the midpoints of each base member so that when the base members are placed in an orthagonal position, the channels interlock together, thereby affixing the base members at right angles. Bores are formed in the channels and through each base members 40 and 41 to allow passage of bolt 50 (best shown in FIG. 2). Bolt 50, when loosened and when the base members are not interlocked, provides a swiveling means so that the base members may be swiveled from the orthogonal position into an aligned position in which the second base is disposed beneath the first base member. In this regard, alignment will be facilitated if member 40 is somewhat shorter than member 41, as shown in FIG. 6.

Inclinable member 44 comprises an elongated member having a U-shaped cross-section. One end of inclinable member 44 is attached to base member 41 adjacent one of feet 43, the sides of member 44 and base member 41 being drilled so as to receive pivot pin 48, best shown in FIG. 2. Inclinable member 44 may then be pivoted about pin 48. At the opposite end of channel 44 is a protrusion 46 formed by removing the sides of the U-shaped member 44, the function of which will be more fully discussed below.

Center brace member 45 is an elongated member fabricated from a metal bar, coupled at one end to inclinable member 44 by pivot pin 56. The other end of brace member 45 has threaded bore 53 formed therein. The bored end of brace member 45 fits adjacent the bore in base member 43 so that bolt 50 may be inserted through the communicating bores in the base members into bore 53 for threadable engagement therewith. The length of brace member 45 and the position of pin 46 in channel 44 is selected so that when brace 45 is vertically oriented by engagement with bolt 50, channel 44 will be positioned at an appropriate angle with respect to base member 41 to support the instrument when in place at a convenient position. By tightening bolt 50 in bore 53, the stand 10 may be securely locked in the erected position.

Referring now to FIGS. 1 to 4, instrument cradle 20 is fastened to protrusion 46. Corresponding bores are formed in curved bracket 30 of the cradle and protrusion 26. Wingnut 23 is threaded onto bolt 22 to secure the bracket 30 and cradle 20 to protrusion 26; the cradle 20 may be easily removed from the stand by removing nut 23 and sliding bolt 22 out of the hole 21 of the protrusion. The ends of bracket 30 curve upwardly away from protrusion 46, as shown in the FIGURES and have slots 28 formed therein, best shown in FIG. 2.

Arcuate arm members 25 are formed with hinge portions 27, which fit into slots 28 at the ends of bracket 30. Hinge pins 29 are inserted through corresponding bores in the ends of bracket 30 and hinge portions 27 so that member 25 has a degree of pivoting movement about the hinge pin. It is desirable that the degree of pivoting movement be somewhat limited, so that the arm members 25 do not pivot completely outward and over. The degree of movement can be limited by spacing the pivot pin 29 from the end of slot 28 so that the end provides a limiting stop. The lower portion 29 of each arcuate member 25 adjacent bracket 30 is concavely curved for contacting the curved surface of the instrument, in the disclosed embodiment, a saxophone. The upper portions 31 of each arcuate member continues this curvature but have outwardly flared ends 32 for guiding the instrument into the cradle 20.

Referring now to FIGS. 1, 2 and 5, lower support bracket 35 is connected to inclinable member 44 between the pivot pin 56 and pin 48. The bracket includes two onwardly flaring supports 38 which are coated with a resilient plastic coating to prevent marring the surface of the instrument. Bracket 35 is secured to member 44 by two rivets extending through the top surface of the channel 44, (best shown in FIG. 5). As shown in FIG. 2, bracket 35 provides a second contracting position to support the instrument.

The operation of cradle unit 20 is shown in FIGS. 3 and 4. When the body of the instrument, in this case a saxophone, is placed in the cradle 20, the instrument will contact the lower portions 29 of the bowed arms, pressing these portions downward, causing arms 29 to pivot about hinges 27, so that the flared ends 31 also contact the instrument body. When the instrument is to be removed, it is simply lifted out of the cradle; in response to the pressure applied to its upper positions, the curved members will pivot upward to release the instrument. Thus, no undue amount of force is needed to remove the instrument, and the musician need not hold down the stand to pull the instrument free.

In FIG. 6, the instrument stand is shown in a collapsed condition. The stand is folded by backing bolt 50 out of bore 53 in brace member 45, pivoting member 45 toward support 35 folding inclinable member 44 downward toward base members 40 and 41, and aligning member 40 along member 41. If desired, the instrument cradle 20 may also be removed. The stand is thereby folded for compact storage and convenient handling and carrying.

While the present invention has been discussed with reference to a preferred embodiment, other variations and embodiments of the subject invention will be apparent to those skilled in the art. For example, a foldable stand may not be required for certain applications; a permanently erected stand utilizing the disclosed cradle member could be suitable for such purposes.

I claim:

1. A collapsible instrument stand comprising:
   first and second elongated base members coupled together at intermediate points thereof by swivel means, said base members having means for selectably interlocking said members together in an angular disposition;
   an elongated inclinable member having first and second ends, said first end pivotally attached to said first base member adjacent one end thereof;
   a center brace member for supporting said inclinable member in an inclined position, said brace member having first and second ends, said first end pivotally attached to said inclinable member, said second end removably coupled to said first base member;
   a self-releasing instrument cradle attached to said inclinable member adjacent said second end thereof, comprising:
   (i) a bracket member;
   (ii) a pair of arm members, each of said arm members having lower and upper musical instrument contacting surfaces; and
   (iii) attaching means for pivotally attaching said arm members to said bracket member such that said arm members may pivot away from one another to an open position so that a musical instrument may be placed between said arm members thereby engaging said lower contacting surfaces and causing said arm members to pivot towards one another to a closed position with said lower and upper contacting surfaces contacting the instruments; and wherein said arm members are positioned by said attaching means on said bracket member relative to one another such that when said arm members are in said closed position, the center of an instrument holding area generally defined by said upper and lower contacting surfaces is displaced above a line which connects the axes about which said arm members pivot;

whereby said stand may be collapsed from the erected position by decoupling said second end of said brace member from said first base member, pivoting said brace member toward said inclinable member, pivoting said inclinable member toward said base members, and swiveling said base members into alignment.

2. The instrument stand of claim 1 wherein said arm members are arcuate arm members which encircle a substantial portion of the instrument when said cradle is in said closed position.

3. The instrument stand of claim 2 wherein said arcuate arm members have lower and upper ends with said upper ends being flared outwardly for guiding an instrument into said cradle.

4. The instrument stand of claim 1 wherein said lower and upper contacting surfaces of said arm members are made of a resilient material.

5. The instrument stand of claim 1 wherein said second end of said center support member is removably coupled to said first base member by a threaded bolt which is inserted through openings provided in said first and second base members and which is received by a corresponding threaded bore in said second end of said support member.

6. The instrument stand of claim 5 wherein said base members are provided with transverse channels in the facing sides of each base member at the intersection thereof with said channels interlocking together when said bolt is tightened in said threaded bore.

7. The instrument stand of claim 1 further comprising a support bracket attached to said inclinable member below and spaced apart from said instrument cradle for contacting and supporting a portion of an instrument placed on said stand.

8. The instrument stand of claim 7 wherein that portion of said support bracket which contacts an instrument is made of a resilient material.

9. The instrument stand of claim 1 wherein said bracket member of said cradle comprises a bracket having first and second ends and wherein said attaching means of said cradle comprises a hinge pin which extends through openings in each of said arm members at a point on said arm members which is generally between said upper and lower contacting surfaces and through an opening in said bracket near each of said ends of said bracket.

10. The instrument stand of claim 9 wherein said hinge pins are displaced from said ends of said bracket a distance such that outward pivoting of said arm members is limited when said ends of said bracket contact said arm members.

11. A collapsible instrument stand comprising:
first and second elongated base members coupled together at intermediate points thereof by swivel means, said base members having means for selectably interlocking said members together in an angular disposition;

an elongated inclinable member having first and second ends, said first end pivotally attached to said first base member adjacent one end thereof;

a center brace member for supporting said inclinable member in an inclined position, said brace member having a first end pivotally attached to said inclinable member and a second end having a threaded bore for receiving a threaded bolt which extends through corresponding bores in said first and second elongated base members at said intermediate points thereof, said means for interlocking said base members comprising interlocking transverse channels in the facing sides at said intermediate points of said base members with said channels interlocking together when said bolt is tightened in said threaded bore thereby interlocking said members together in an angular disposition with said second end of said center brace coupled to said first elongated base member;

a self releasing instrument cradle attached to said inclinable member adjacent said second end thereof, comprising:
(i) a bracket having first and second ends;
(ii) a pair of arm members, each of said arm members having lower and upper musical instrument contacting surfaces; and
(iii) attaching means for pivotally attaching said arm members at a point on said arm members intermediate said lower and upper contacting surfaces to said bracket adjacent each of said ends thereof such that said arm members may pivot away from one another to an open position so that a musical instrument may be placed between said arm members thereby engaging said lower contacting surfaces and causing said arm members to pivot toward one another to a closed position with said lower and upper contacting surfaces contacting the instrument; and wherein said arm members are positioned by said attaching means on said bracket relative to one another such that when said arm members are in said closed position, the center of an instrument holding area generally defined by said upper and lower contacting surfaces is displaced above a line which connects the axes about which said arm members pivot;

whereby said stand may be collapsed from the erected position by loosening said bolt and decoupling said second end of said brace member from said first base member, pivoting said brace member toward said inclinable member, pivoting said inclinable member toward said base members, and swiveling said base members into alignment.

12. The instrument stand of claim 11 wherein said arm members are arcuate arm members which encircle a substantial portion of the instrument when said cradle is in said closed position.

13. The instrument stand of claim 12 further comprising a support bracket attached to said inclinable member below and spaced apart from said instrument cable for contacting and supporting a portion of an instrument placed on said stand.

14. The instrument stand of claim 13 wherein said contacting surfaces of said arm members and that portion of said support bracket which contacts an instrument is made of a resilient material.

* * * * *

UNITED STATES PATENT AND TRADEMARK OFFICE
CERTIFICATE OF CORRECTION

PATENT NO. : 4,215,838
DATED : August 5, 1980
INVENTOR(S) : Leonard Gullota

It is certified that error appears in the above-identified patent and that said Letters Patent are hereby corrected as shown below:

In Column 4, line 11, please delete "positions" and insert in lieu thereof --portions--.

Signed and Sealed this

Twenty-fourth Day of May 1983

[SEAL]

Attest:

DONALD J. QUIGG

*Attesting Officer*  *Acting Commissioner of Patents and Trademarks*